US010974248B2

(12) United States Patent
Demsia et al.

(10) Patent No.: US 10,974,248 B2
(45) Date of Patent: Apr. 13, 2021

(54) ADAPTER FOR LABORATORY CELL STRAINER

(71) Applicant: MTC Bio, Inc., Sayreville, NJ (US)

(72) Inventors: Walter Demsia, Holmdel, NJ (US); Michael Demsia, Jersey City, NJ (US)

(73) Assignee: MTC Bio Inc., Sayreville, NJ (US)

( * ) Notice: Subject to any disclaimer, the term of this patent is extended or adjusted under 35 U.S.C. 154(b) by 232 days.

(21) Appl. No.: 15/920,939

(22) Filed: Mar. 14, 2018

(65) Prior Publication Data
US 2019/0283028 A1 Sep. 19, 2019

(51) Int. Cl.
*B01L 3/00* (2006.01)
*G01N 1/28* (2006.01)
(Continued)

(52) U.S. Cl.
CPC .............. B01L 3/563 (2013.01); *A62B 7/00* (2013.01); *B01D 23/28* (2013.01); *B01D 29/01* (2013.01); *B01D 29/05* (2013.01); *B01D 29/085* (2013.01); *B01D 35/00* (2013.01); *B01D 61/18* (2013.01); *B01D 2201/182* (2013.01); *B01D 2201/30* (2013.01); *B01D 2201/309* (2013.01); *B01L 3/56* (2013.01); *B01L 3/5635* (2013.01); *B01L 2200/023* (2013.01); *B01L 2200/026* (2013.01); *B01L 2200/12* (2013.01);
(Continued)

(58) Field of Classification Search
CPC .... B01L 3/563; B01L 3/56; B01L 2300/0832; B01L 2300/0681; B01L 3/5635; B01L 2200/023; B01L 2300/12; B01L 2200/12; B01L 2200/026; B01D 2201/182; B01D 2201/309; B01D 2201/30; B01D 61/18; B01D 29/01; B01D 29/05; B01D 35/00; B01D 29/085; B01D 23/28; B65B 29/02; A62B 7/00; G01N 1/28
See application file for complete search history.

(56) References Cited

U.S. PATENT DOCUMENTS 3,912,638 A * 10/1975 Beaubien ............. B01D 29/085
 210/455
4,251,366 A * 2/1981 Simon ..................... B01L 3/565
 210/406

(Continued)

OTHER PUBLICATIONS

MTC Bio "New Product Announcement for SureStrain (TM) Premium Cell Strainers" dated Jun. 23, 2016.

*Primary Examiner* — Benjamin R Whatley
*Assistant Examiner* — Curtis A Thompson
(74) *Attorney, Agent, or Firm* — FisherBroyles, LLP

(57) ABSTRACT

An adapter for laboratory cell strainer is disclosed. The adapter includes a unitary structure having an annular top surface, an annular bottom surface, a smooth inner surface, an outer surface, and an opening extending therethrough. The adapter has a downwardly and radially inwardly sloped funnel section terminating in a cylindrical edge at the annular bottom surface with a lower section of the funnel section having a narrowed, tapered diameter. The outer surface of a middle section of the funnel section has an annular neck configured therearound with a plurality of radially protruding ribs. The unitary structure is configured for connection to the laboratory cell strainer at the annular top surface and placement inside a various sized laboratory tube for receiving filtered liquid during use.

19 Claims, 5 Drawing Sheets

(51) Int. Cl.
*B01D 29/085* (2006.01)
*B01D 35/00* (2006.01)
*B65B 29/02* (2006.01)
*A62B 7/00* (2006.01)
*B01D 61/18* (2006.01)
*B01D 29/01* (2006.01)
*B01D 29/05* (2006.01)

(52) U.S. Cl.
CPC .................. *B01L 2300/0681* (2013.01); *B01L 2300/0832* (2013.01); *B01L 2300/12* (2013.01); *B65B 29/02* (2013.01); *G01N 1/28* (2013.01)

(56) References Cited

U.S. PATENT DOCUMENTS

| | | |
|---|---|---|
| 6,752,183 B2 | 6/2004 | Leoncavallo |
| 2004/0005246 A1* | 1/2004 | Efthimiadis ....... A61B 10/0051 422/534 |
| 2009/0216213 A1* | 8/2009 | Muir .................. A61B 10/0051 604/414 |
| 2010/0038303 A1* | 2/2010 | Cai ........................... B01L 3/56 210/406 |
| 2013/0017620 A1* | 1/2013 | Scott ..................... G01N 1/405 436/177 |
| 2013/0306576 A1* | 11/2013 | Bosio .................. B01D 35/306 210/767 |

* cited by examiner

ADAPTER FOR LABORATORY CELL STRAINER

TECHNICAL FIELD

The present disclosure relates to the field of laboratory products for scientific research, and more particularly, to an improved adapter for use with laboratory cell strainer systems in the handling of biological and chemical filtered liquid.

BACKGROUND

Conventional adapters used in the laboratory environment have many disadvantages. First, a single conventional adapter is unable to fit various sized laboratory tubes and hence if a variety of adapter sizes is required, a large inventory of adapters must be acquired and stored. Second, existing adapters fail to provide a secure fit and stability when used with various sized laboratory tubes. Third, conventional adapters tend to have sharp, interior surfaces that are prone to catching or retaining liquids. Fourth, existing adapters used with laboratory cell strainer systems have not solved the problem of air-lock, which prevents filtered liquid from flowing freely into the laboratory tube.

It would thus be desirable to have an improved adapter for use with other laboratory products, among other desirable features as described herein, which avoids the disadvantages of conventional adapters used in the laboratory.

SUMMARY

In a first aspect, there is provided herein an adapter for laboratory cell strainer, according to the present disclosure. The adapter includes a unitary structure having an annular top surface, an annular bottom surface, a smooth inner surface, an outer surface, and an opening extending therethrough. The adapter has a downwardly and radially inwardly sloped funnel section wherein the tunnel section has an upper section with a first slope, a middle section with a second slope, section terminating in a cylindrical edge at the annular bottom surface with a lower section of the funnel section having a narrowed, tapered diameter. The middle section comprises an annular neck, the annular neck having a proximal end and a distal end, both the proximal end and the distal end being integrally formed with outer surface of a middle section of the funnel section the an annular neck not extending below the lower section and configured therearound with a plurality of radially protruding ribs. The unitary structure is configured for connection to the laboratory cell strainer at the annular top surface and placement inside a various sized laboratory tube for receiving filtered liquid during use.

In certain embodiments, the middle section of the funnel section is configured with a tapered diameter that is greater than the narrowed, tapered diameter of the lower section of the funnel section.

In certain embodiments, an upper section of the funnel section is configured with a tapered diameter that is greater than the tapered diameter of the middle section of the funnel section.

In certain embodiments, the upper section of the funnel section is configured with a gradual radially inward slope for directing the filtered liquid therethrough.

In certain embodiments, the plurality of radially protruding ribs are longitudinal and oriented vertically for providing stability and a secure fit inside the various sized laboratory tube during use.

In certain embodiments, the plurality of radially protruding ribs are configured to gradually flare outward from a proximal end to a distal end of the annular neck.

In certain embodiments, the plurality of radially protruding ribs are evenly or unevenly spaced therearound the annular neck on the outer surface of the middle section of the funnel section.

In certain embodiments, the plurality of radially protruding ribs are configured for preventing air lock, thereby allowing the filtered liquid to flow freely into the various sized laboratory tube during use.

In certain embodiments, at least some of the middle section of the funnel section is dimensioned or shaped to provide a frictional engagement with the various sized laboratory tube during use.

In certain embodiments, the smooth inner surface and the downwardly and radially inwardly sloped funnel section of the unitary structure are configured for directing the filtered liquid therethrough the opening at the annular bottom surface without any residual filtered liquid left behind.

In certain embodiments, the smooth inner surface of the middle section is configured with a gradual radially inward slope for directing the filtered liquid therethrough.

In certain embodiments, the adapter is manufactured via 3D printing, injection molding, extrusion molding or vacuum molding.

In certain embodiments, the adapter is fabricated of polycarbonate plastic, polyethylene plastic or polypropylene plastic.

Various advantages of this disclosure will become apparent to those skilled in the art from the following detailed description, when read in light of the accompanying drawings.

DETAILED DESCRIPTION

This disclosure is not limited to the particular apparatus, systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All sizes recited in this document are by way of example only, and the disclosure is not limited to structures having the specific sizes or dimensions recited below. As used herein, the term "comprising" means "including, but not limited to."

In consideration of the figures, it is to be understood for purposes of clarity that certain details of construction and/or operation are not provided in view of such details being conventional and well within the skill of the art upon disclosure of the document described herein.

The present disclosure pertains to an adapter for use with laboratory strainer. The adapter enables various brands of cell strainer products to be used with various sizes and brands of laboratory tubes rather than being limited to large (50 mL) laboratory tubes. The adapter, with its tapered and vertically oriented ribbed design, provides stability and a secure fit inside various sized laboratory tubes during use. The smooth inner surface and downwardly and radially inwardly sloped funnel section of the adapter are designed for directing filtered liquid therethrough the opening at the annular bottom surface without any residual filtered liquid left behind. When used concurrently with the cell strainer, the adapter prevents air lock, thereby allowing liquid to flow freely into various sized laboratory tubes. Thus, the adapter makes decanting liquids into various sized laboratory tubes less prone to spillage.

Figure 1:
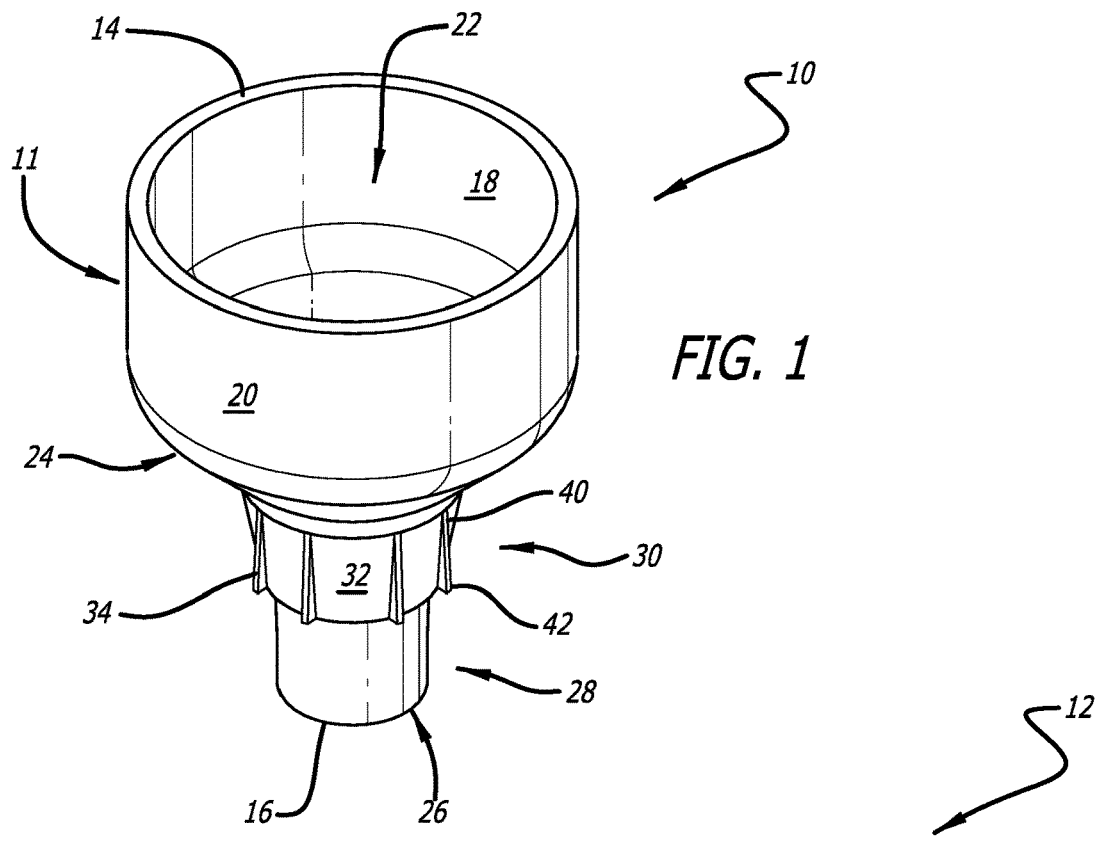
FIG. 1 is a top perspective view of an adapter in accordance with an example embodiment of the present disclosure.
Figure 2:
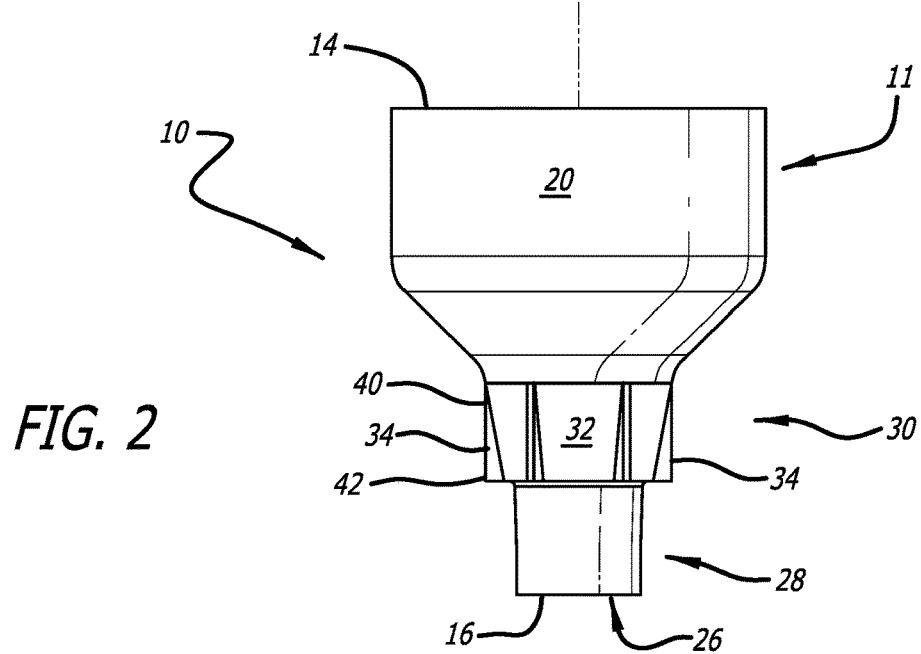
FIG. 2 is a side elevation view of a laboratory cell strainer and the adapter of FIG. 1 showing alignment of the laboratory cell strainer for securing atop and therein the adapter in accordance with an example embodiment of the present disclosure.

Referring now to FIG. 1 is a top perspective view of the adapter 10 for laboratory cell strainer 12 according to the present disclosure. FIG. 2 is a side elevation view of the laboratory cell strainer 12 and the adapter 10 showing alignment of the laboratory cell strainer 12 for securing atop and therein the adapter 10. The adapter 10 includes a unitary structure 11 having an annular top surface 14, an annular bottom surface 16, a smooth inner surface 18, an outer surface 20, and an opening 22 extending therethrough. The adapter 10 has a downwardly and radially inwardly sloped funnel section 24 terminating in a cylindrical edge 26 at the annular bottom surface 16 with a lower section 28 of the funnel section 24 having a narrowed, tapered diameter D1. The outer surface 20 of a middle section 30 of the funnel section 24 has an annular neck 32 configured therearound with a plurality of radially protruding ribs 34. The unitary structure 11 is configured for connection to the laboratory cell strainer 12 at the annular top surface 14 and placement inside a various sized laboratory tube 36 (FIGS. 3-6) for receiving a laboratory sample or filtered liquid 38 (FIGS. 5-6) during use.

In the illustrated embodiments, the plurality of radially protruding ribs 34 are longitudinal and oriented vertically for providing stability and a secure fit inside the various sized laboratory tube 36 during use.

In some embodiments, the plurality of radially protruding ribs 34 are configured to gradually flare outward from a proximal end 40 to a distal end 42 of the annular neck 32.

In other embodiments, the plurality of radially protruding ribs 34 can be either evenly spaced or unevenly spaced in any suitable configuration therearound the annular neck 32 on the outer surface 20 of the middle section 30 of the funnel section 24.

In further embodiments, the plurality of radially protruding ribs 34 are configured for preventing air lock when used with the laboratory cell strainer (see airflow direction represented by arrows in FIG. 6), thereby allowing the filtered liquid 38 to flow freely into the various sized laboratory tube 36 (a 5 ml tube in this embodiment) during use.

In other embodiments, at least some of the middle section 30 of the funnel section 24 is dimensioned or shaped to provide a frictional engagement with the various sized laboratory tube during use.

Figure 3:
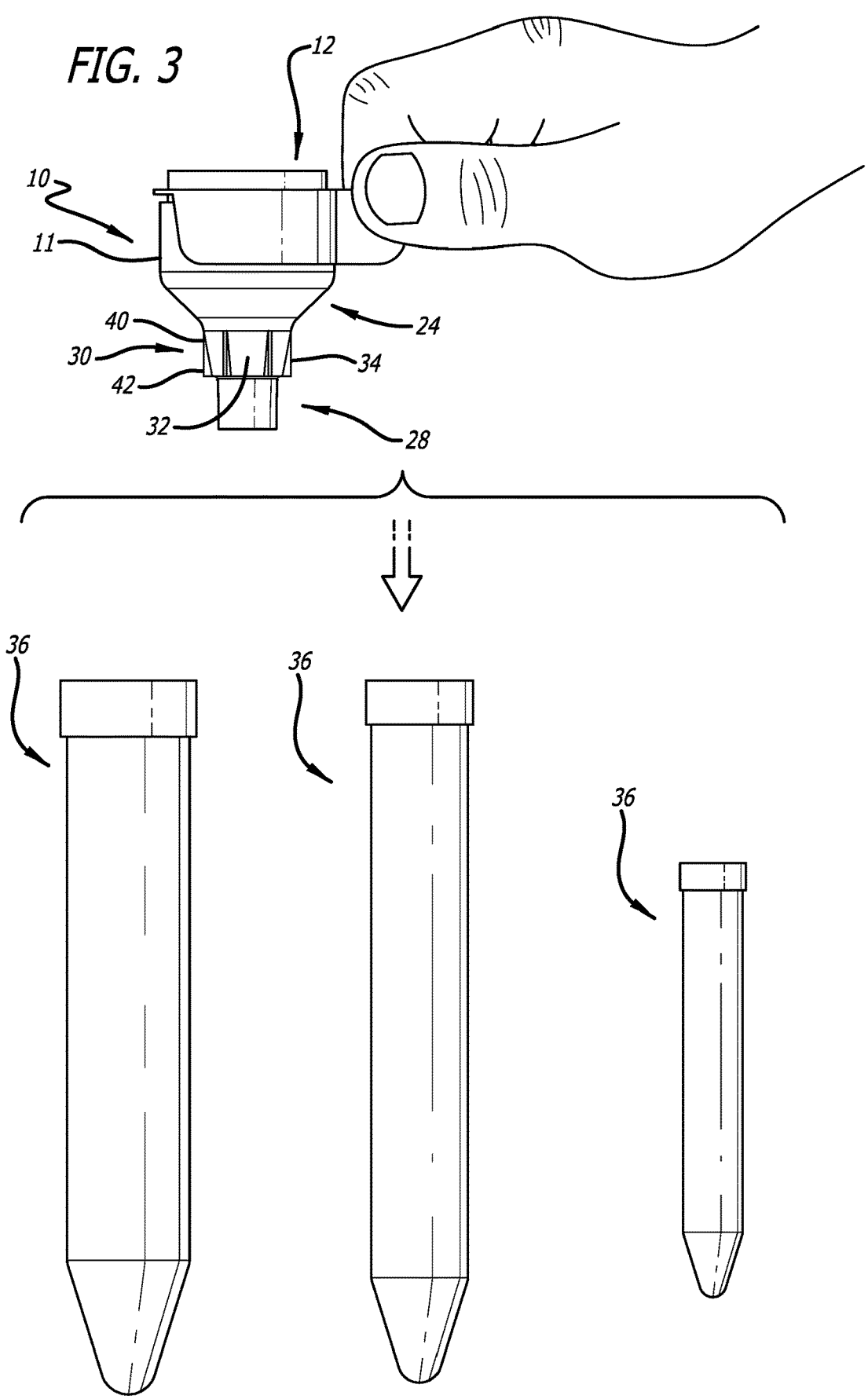
FIG. 3 is side elevation view of the laboratory cell strainer and the adapter of FIG. 2 showing use with various sized laboratory tubes in accordance with an example embodiment of the present disclosure.
Figure 4:
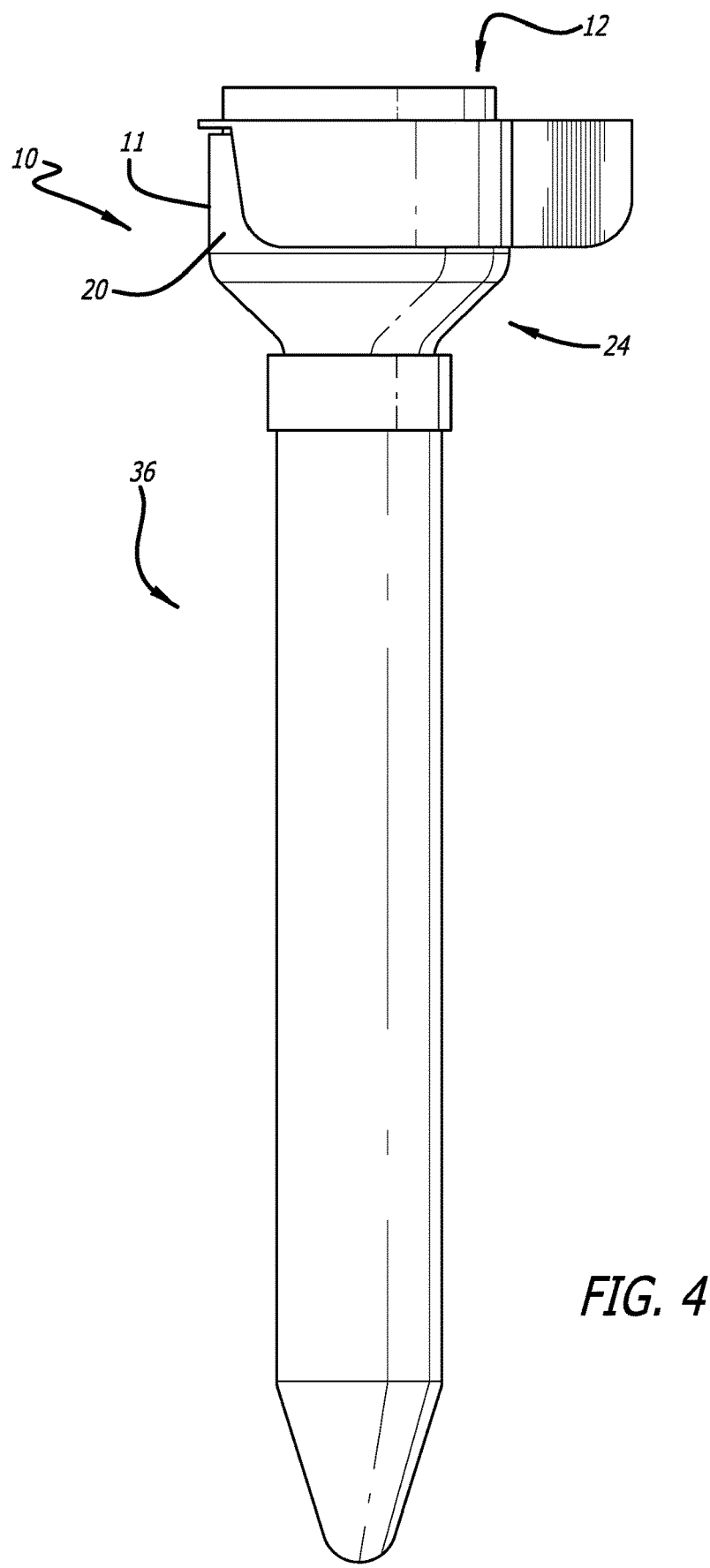
FIG. 4 is a side elevation view of the laboratory cell strainer and the adapter of FIG. 3 secured therein a various sized laboratory tube in accordance with an example embodiment of the present disclosure.

FIG. 3 is side elevation view of the laboratory cell strainer 12 and the adapter 10 showing use with various sized laboratory tubes 36. FIG. 4 is a side elevation view of the laboratory cell strainer 12 and the adapter 10 secured therein a various sized laboratory tube 36. It is to be understood that the adapter 10 of the present disclosure is configured for use with various sized laboratory tubes 36 in standard sizes, including, but not limited to, 5 ml, 15 ml, 10 mm, 12 mm, and the like.

Figure 5:
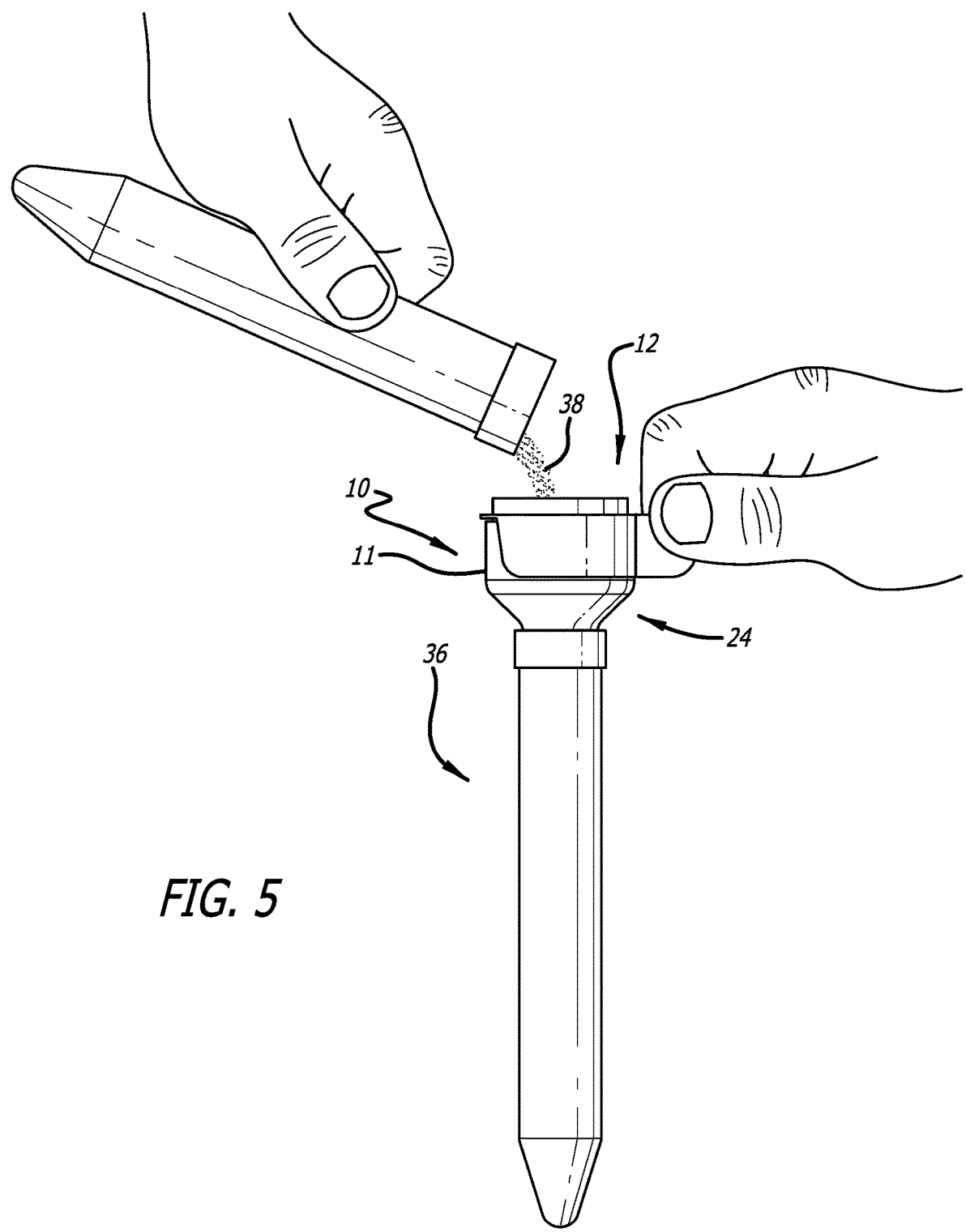
FIG. 5 is a side elevation view of a laboratory sample being poured into the laboratory cell strainer and the adapter of FIG. 4 in accordance with an example embodiment of the present disclosure.
Figure 6:
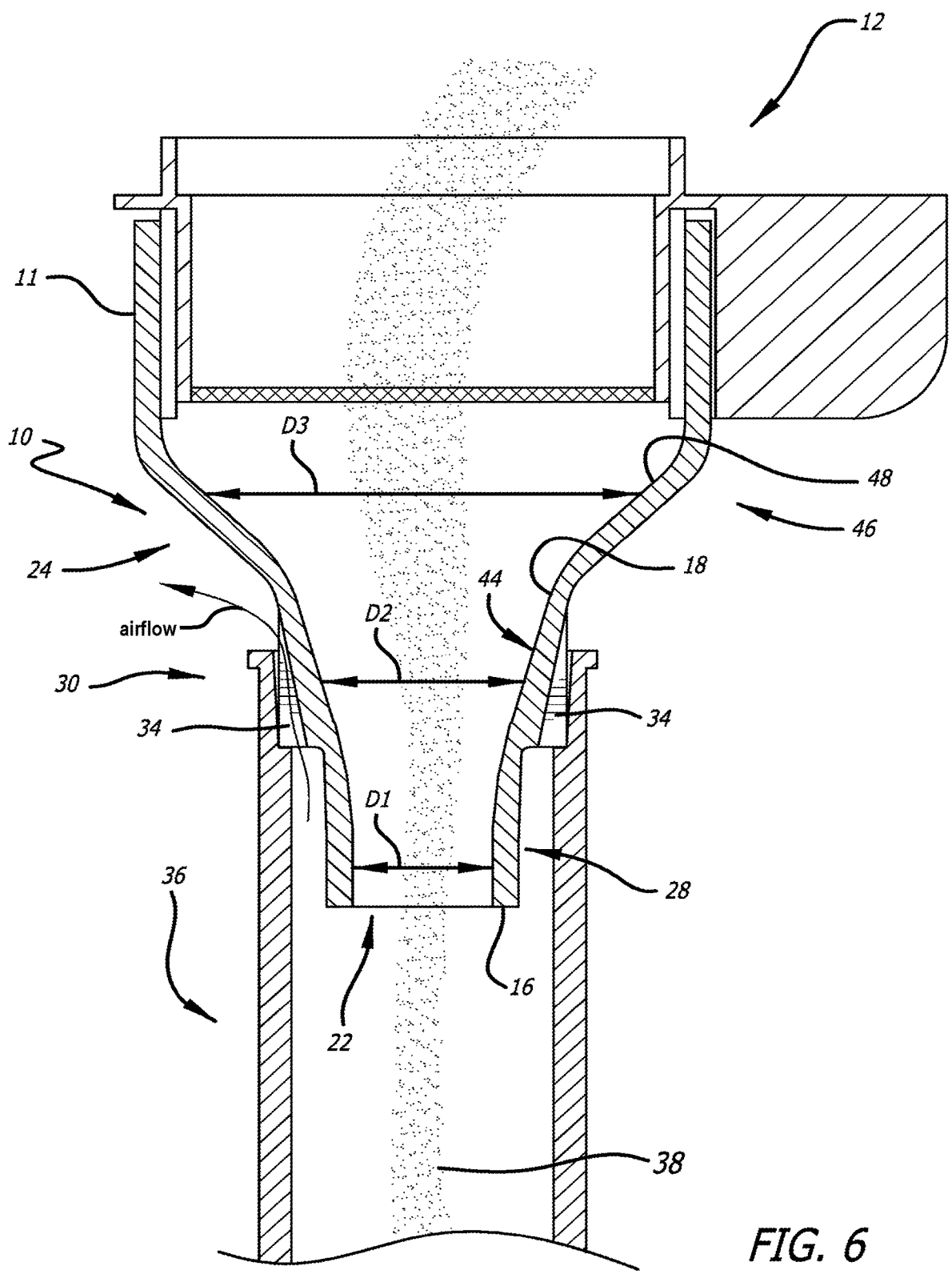
FIG. 6 is a cross-section view of the laboratory cell strainer and the adapter secured therein a various sized laboratory tube in use in accordance with an example embodiment of the present disclosure.

FIG. 5 is a side elevation view of a laboratory sample 38 being poured into the laboratory cell strainer 12 and the adapter 10. FIG. 6 is a cross-section view of the laboratory cell strainer 12 and the adapter 10 secured therein a various sized laboratory tube 36 in use with filtered liquid 38 flowing therethrough. In the illustrated embodiments, the smooth inner surface 18 and the downwardly and radially inwardly sloped funnel section 24 of the unitary structure 11 are configured for directing the filtered liquid 38 therethrough the opening 22 at the annular bottom surface 16 without any residual filtered liquid 38 left behind. The smooth inner surface 18 of the middle section 30 of the funnel section 24 is configured with a gradual radially inward slope 44 for directing the filtered liquid 38 therethrough.

In some embodiments, the middle section 30 of the funnel section 24 is configured with a tapered diameter D2 that is greater than the narrowed, tapered diameter D1 of the lower section 28 of the funnel section 24.

In other embodiments, an upper section 46 of the funnel section 24 is configured with a tapered diameter D3 that is greater than the tapered diameter D2 of the middle section 30 of the funnel section 24.

In further embodiments, the upper section 46 of the funnel section 24 is configured with a gradual radially inward slope 48 for directing the filtered liquid 38 therethrough.

In accordance with the present disclosure, the adapter 10 can be manufactured via 3D printing, injection molding, extrusion molding, vacuum molding or any suitable manufacturing process.

It is to be understood that the adapter 10 can be fabricated of polycarbonate plastic, polyethylene plastic, polypropylene plastic, or any suitable sturdy material.

These and other advantages of the present disclosure will be apparent to those skilled in the art. Accordingly, it will be recognized by those skilled in the art that changes or modifications may be made to the above-described embodiments without departing from the broad inventive concepts of the present disclosure. It should therefore be understood that the present disclosure is not limited to the particular embodiments described herein, but is intended to include all changes and modifications that are within the scope and spirit of the disclosure as encompassed by the disclosure and figures herein and the following claims.

What is claimed is:

1. An adapter for a laboratory cell strainer, comprising:
  a unitary structure having an annular top surface, an annular bottom surface, an inner surface, an outer surface, and an opening extending therethrough, and having a downwardly and radially inwardly sloped funnel section, wherein the funnel section has an upper section with a first slope, a middle section with a second slope, and a lower section with a third slope, the first slope being less vertical than the second slope and the second slope being less vertical than the third slope, wherein the lower section terminates in a cylindrical edge at the annular bottom surface and has a narrowed, tapered diameter, and wherein the lower section is configured to be positioned inside a various sized laboratory tube for receiving filtered liquid during use, wherein the middle section comprises an annular neck, the annular neck having a proximal end and a distal end, both the proximal end and the distal end being integrally formed with the outer surface of the middle section, the annular neck not extending below the lower section and configured therearound with a plurality of radially protruding ribs, and wherein the annular top surface is configured to receive a laboratory cell strainer, so that a filter of the laboratory cell strainer is positioned above the funnel section.

2. The adapter of claim 1, wherein the middle section of the funnel section is configured with a tapered diameter that is greater than the narrowed, tapered diameter of the lower section of the funnel section.

3. The adapter of claim 2, wherein the upper section of the funnel section is configured with a tapered diameter that is greater than the tapered diameter of the middle section of the funnel section.

4. The adapter of claim 3, wherein the upper section of the funnel section is configured with a gradual radially inward slope for directing the filtered liquid therethrough.

5. The adapter of claim 1, wherein the plurality of radially protruding ribs are longitudinal and oriented vertically for providing stability and a secure fit inside the various sized laboratory tube during use.

6. The adapter of claim 1, wherein the plurality of radially protruding ribs are configured to gradually flare outward from a proximal end to a distal end of the annular neck.

7. The adapter of claim 1, wherein the plurality of radially protruding ribs are evenly or unevenly spaced therearound the annular neck on the outer surface of the middle section of the funnel section.

8. The adapter of claim 7, wherein a space between two adjacent radically protruding ribs of the plurality of radially protruding ribs allows air flow and prevents air lock when the filtered liquid flows into the various sized laboratory tube.

9. The adapter of claim 1, wherein at least some of the middle section of the funnel section is dimensioned or shaped to provide a frictional engagement with the various sized laboratory tube during use.

10. The adapter of claim 1, wherein the inner surface of the middle section is configured with a gradual radially inward slope for directing the filtered liquid therethrough.

11. The adapter of claim 1, wherein the adapter is manufactured via 3D printing, injection molding, extrusion molding or vacuum molding.

12. The adapter of claim 1, wherein the adapter is fabricated of polycarbonate plastic, polyethylene plastic or polypropylene plastic.

13. A cell filtration device, comprising:
a laboratory cell strainer; and
a unitary structure having an annular top surface, an annular bottom surface, an inner surface, an outer surface, and an opening extending therethrough, and having a downwardly and radially inwardly sloped funnel section, wherein the funnel section has an upper section with a first slop, a middle section with a second slop, and a lower section with a third slop, the first slope being less vertical than the second slope and the second slope being less vertical than the third slope, wherein the lower section terminates in a cylindrical edge at the annular bottom surface and has a narrowed, tapered diameter, and wherein the lower section is configured to be positioned inside a various sized laboratory tube for receiving filtered liquid during use, wherein the middle section comprises an annular neck, the annular neck having a proximal end and a distal end, both the proximal end and the distal end being integrally formed with the outer surface of the middle section, the annular neck not extending below the lower section and configured therearound with a plurality of radially protruding ribs, and wherein the annular top surface is configured to receive a laboratory cell strainer, so that a filter of the laboratory cell strainer is positioned above the funnel section.

14. The cell filtration device of claim 13, wherein the middle section of the funnel section is configured with a tapered diameter that is greater than the narrowed, tapered diameter of the lower section of the funnel section.

15. The cell filtration device of claim 14, wherein the upper section of the funnel section is configured with a tapered diameter that is greater than the tapered diameter of the middle section of the funnel section.

16. The adapter of claim 15, wherein the upper section of the funnel section is configured with a gradual radially inward slope for directing the filtered liquid therethrough.

17. The adapter of claim 13, wherein the plurality of radially protruding ribs are longitudinal and oriented vertically for providing stability and a secure fit inside the various sized laboratory tube during use.

18. The adapter of claim 13, wherein the plurality of radially protruding ribs are configured to gradually flare outward from a proximal end to a distal end of the annular neck.

19. The adapter of claim 13, wherein the plurality of radially protruding ribs are evenly or unevenly spaced therearound the annular neck on the outer surface of the middle section of the funnel section, and wherein a space between two adjacent radically protruding ribs of the plurality of radially protruding ribs allows air flow and prevents air lock when the filtered liquid flows into the various sized laboratory tube.

* * * * *